US012526323B2

(12) United States Patent
Bansal et al.

(10) Patent No.: US 12,526,323 B2
(45) Date of Patent: Jan. 13, 2026

(54) SELF HEALING NETWORK SECURITY POLICY MANAGEMENT

(71) Applicant: Salesforce, Inc., San Francisco, CA (US)

(72) Inventors: Kaushal Bansal, Pleasanton, CA (US); Prabhat Singh, San Jose, CA (US); Amit Chakrabarty, Fremont, CA (US)

(73) Assignee: Salesforce, Inc., San Francisco, CA (US)

(*) Notice: Subject to any disclaimer, the term of this patent is extended or adjusted under 35 U.S.C. 154(b) by 393 days.

(21) Appl. No.: 18/183,490

(22) Filed: Mar. 14, 2023

(65) Prior Publication Data

US 2024/0314175 A1    Sep. 19, 2024

(51) Int. Cl.
*H04L 9/40*    (2022.01)

(52) U.S. Cl.
CPC ........ *H04L 63/205* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 6,577,597 B1 * | 6/2003 | Natarajan | ........... | H04L 41/0816 370/232 |
| 7,627,891 B2 * | 12/2009 | Williams | ........... | H04L 63/1408 709/224 |
| 8,769,607 B1 * | 7/2014 | Jerdonek | ................. | G06F 21/31 726/4 |
| 9,197,668 B2 * | 11/2015 | Boucher | ............... | H04L 63/101 |
| 9,225,743 B1 * | 12/2015 | Naik | ................... | H04L 63/1425 |
| 9,582,662 B1 * | 2/2017 | Messick | ................ | G06F 21/554 |
| 9,716,617 B1 * | 7/2017 | Ahuja | ................. | H04L 41/0816 |
| 10,810,233 B2 | 10/2020 | Bansal et al. | | |
| 11,743,298 B1 * | 8/2023 | Badana | ................. | H04L 63/104 726/1 |
| 12,107,869 B1 * | 10/2024 | Kannan | ................... | H04L 63/20 |
| 12,160,435 B2 * | 12/2024 | Sloane | .................. | H04L 63/205 |
| 2007/0128899 A1 * | 6/2007 | Mayer | .................. | G06F 9/4406 439/152 |
| 2007/0180490 A1 * | 8/2007 | Renzi | .................... | G06F 21/604 726/1 |

(Continued)

OTHER PUBLICATIONS

Srinivas Tallapragada, Behind the Scenes of Hyperforce: Salesforce's Infrastructure for the Public Cloud, https://engineering.salesforce.com/behind-the-scenes-of-hyperforce-salesforces-infrastructure-for-the-public-cloud-429309542d8e/?source=friends_link&sk=0a22b253fffe0c7265ed602bd7e4e7fb, printed Mar. 14, 2023, 4 pgs.

(Continued)

*Primary Examiner* — Kambiz Zand
*Assistant Examiner* — Mahabub S Ahmed
(74) *Attorney, Agent, or Firm* — Kwan & Olynick LLP

(57) ABSTRACT

In some embodiments, a method determines a first functional domain that includes a group of security policies that have been copied from a second functional domain. Network flow data is queried to determine network traffic that is associated with a security policy in the group of security policies in the first functional domain. The method analyzes utilization of the security policy based on the network traffic. Based on the analyzing, a recommendation is generated to change the security policy in the first functional domain.

20 Claims, 8 Drawing Sheets

(56) References Cited

U.S. PATENT DOCUMENTS

| | | | |
|---|---|---|---|
| 2011/0072506 A1* | 3/2011 | Law | H04L 63/1416 726/11 |
| 2011/0209196 A1* | 8/2011 | Kennedy | G06Q 30/02 726/1 |
| 2011/0276396 A1* | 11/2011 | Rathod | G06F 16/2428 707/706 |
| 2014/0259092 A1* | 9/2014 | Boucher | H04L 63/0272 726/1 |
| 2014/0373091 A1* | 12/2014 | Kirner | H04L 41/0893 726/1 |
| 2015/0381662 A1* | 12/2015 | Nair | H04L 63/20 726/1 |
| 2016/0191466 A1* | 6/2016 | Pernicha | H04L 63/20 726/1 |
| 2016/0294875 A1* | 10/2016 | Lian | G06F 9/45558 |
| 2017/0013018 A1* | 1/2017 | Nakata | H04L 12/6418 |
| 2017/0048268 A1* | 2/2017 | Rieke | H04L 63/20 |
| 2018/0077027 A1* | 3/2018 | VanderKwaak | H04L 41/22 |
| 2018/0159876 A1* | 6/2018 | Park | H04L 63/1425 |
| 2018/0278648 A1* | 9/2018 | Li | H04L 63/1425 |
| 2020/0120142 A1* | 4/2020 | Maynard | G06Q 10/067 |
| 2020/0128038 A1* | 4/2020 | Neystadt | H04L 63/101 |
| 2020/0314066 A1* | 10/2020 | Cruz Farmer | H04L 63/0245 |
| 2021/0073220 A1 | 3/2021 | Bansal et al. | |
| 2021/0126948 A1* | 4/2021 | Nedbal | H04L 63/105 |
| 2021/0234890 A1 | 7/2021 | Bansal et al. | |
| 2021/0234898 A1* | 7/2021 | Desai | H04L 63/104 |
| 2021/0241047 A1 | 8/2021 | Karanth et al. | |
| 2021/0241179 A1 | 8/2021 | Karanth et al. | |
| 2021/0263663 A1 | 8/2021 | Bansal et al. | |
| 2021/0328807 A1 | 10/2021 | Bansal et al. | |
| 2021/0409376 A1* | 12/2021 | Nagargoje | H04L 63/1425 |
| 2022/0006842 A1* | 1/2022 | Wadhwa | H04L 63/20 |
| 2022/0086189 A1 | 3/2022 | Nguyen et al. | |
| 2022/0086193 A1 | 3/2022 | Nguyen et al. | |
| 2022/0311804 A1* | 9/2022 | Talati | H04L 63/205 |
| 2022/0311805 A1* | 9/2022 | Talati | H04L 63/20 |
| 2022/0321533 A1* | 10/2022 | Zheng | H04L 61/251 |
| 2023/0007047 A1* | 1/2023 | Guy | H04L 63/104 |
| 2023/0071264 A1* | 3/2023 | Hakala | G06F 21/566 |
| 2023/0114050 A1* | 4/2023 | Cai | H04L 41/145 726/11 |
| 2023/0128064 A1* | 4/2023 | Wang | H04L 63/0236 726/1 |
| 2023/0179571 A1* | 6/2023 | Kambi Ravi | H04L 63/104 726/1 |
| 2023/0179572 A1* | 6/2023 | Kambi Ravi | H04L 63/0263 726/1 |
| 2023/0319115 A1* | 10/2023 | Shah | H04L 63/205 726/1 |
| 2024/0106867 A1* | 3/2024 | Shaik | H04L 41/0816 |
| 2024/0152374 A1* | 5/2024 | Makhijani | G06F 9/45558 |
| 2024/0154980 A1* | 5/2024 | Kaciulis | H04L 63/20 |
| 2024/0250951 A1* | 7/2024 | Llamas Virgen | H04L 63/105 |
| 2024/0275817 A1* | 8/2024 | Grout | H04L 63/1425 |
| 2024/0348663 A1* | 10/2024 | Crabtree | H04L 63/104 |

OTHER PUBLICATIONS

U.S. Appl. No. 17/961,743, filed Oct. 7, 2022, 23 pgs.

* cited by examiner

SELF HEALING NETWORK SECURITY POLICY MANAGEMENT

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to computer networks and more specifically to network security.

BACKGROUND

Enterprises may have a software system that may be a conglomerate of independent subsystems. These subsystems may be separated by boundaries, such as via geographic boundaries. For example, the enterprise may separate their software system in multiple cloud networks. The enterprise may apply security policies, such as via a firewall, at the boundaries of the subsystems. Applying policies for each subsystem may be burdensome. In some examples, the enterprise may configure security policies for one subsystem. Then, the enterprise may copy these security policies to another subsystem. This may save time for the enterprise in configuring the security policies of another subsystem. However, the security policies of one's subsystem may not be ideal for another subsystem. This may result in vulnerabilities for the subsystems.

BRIEF DESCRIPTION OF THE DRAWINGS

The included drawings are for illustrative purposes and serve only to provide examples of possible structures and operations for the disclosed inventive systems, apparatus, methods and computer program products for network security. These drawings in no way limit any changes in form and detail that may be made by one skilled in the art without departing from the spirit and scope of the disclosed implementations.

DETAILED DESCRIPTION

Overview

Figure 1:
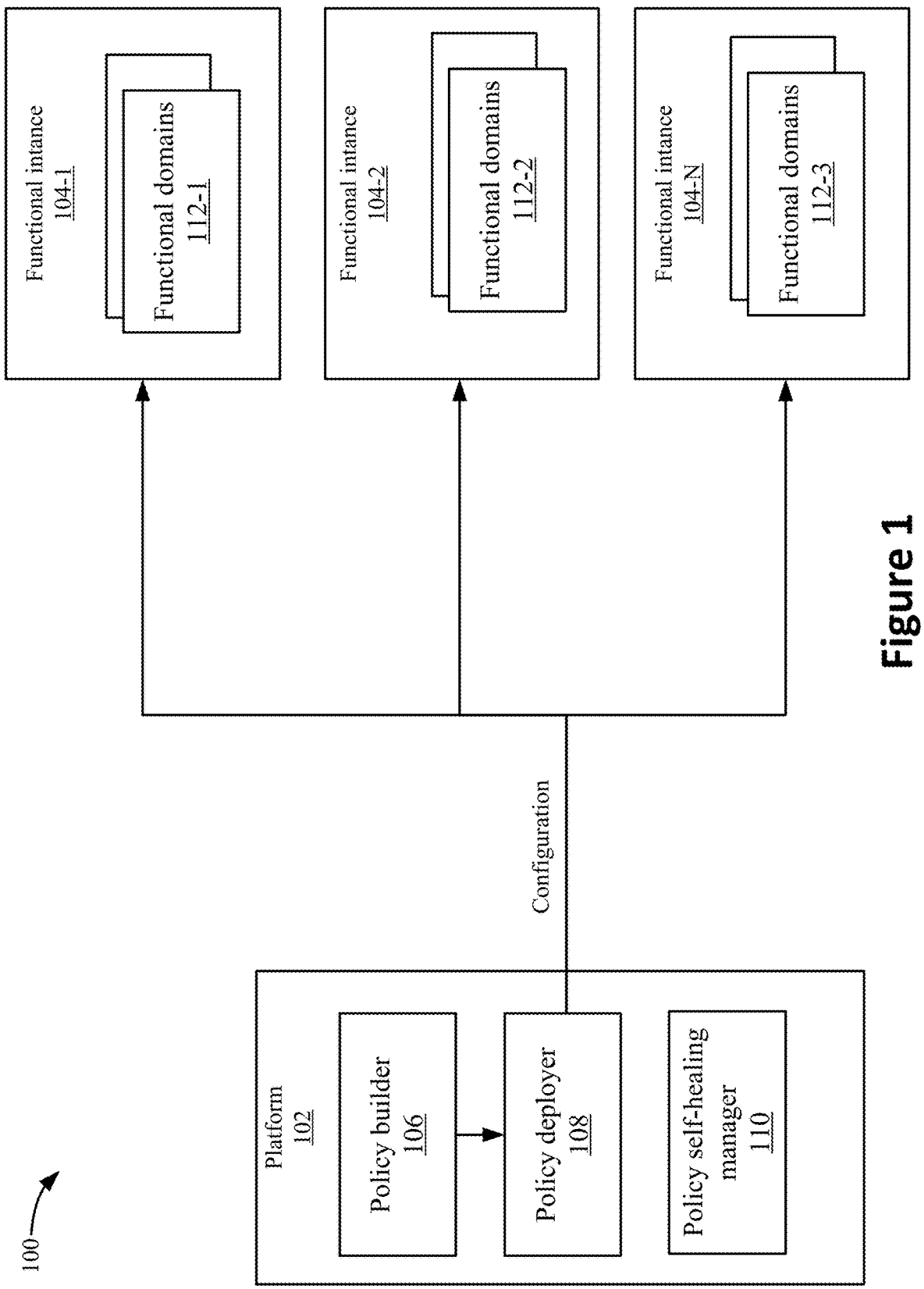
FIG. 1 depicts an example of a system for analyzing policies according to some embodiments.

An enterprise may have multiple deployments of a software system. For example, the software system may be separated by functional instances. In some examples, a functional instance may be an instance of a public cloud deployment, a private cloud deployment, portions thereof, or any portion of a network. Each functional instance may include a number of functional domains. A functional domain may be associated with a group of security policies. For example, a functional domain may be created for the purpose of sales, marketing, or human resources. For each functional domain, a group of security policies may be identified. To improve the configuration of the software system, the enterprise may reuse functional domains in other functional instances. For example, the enterprise may copy the security policies for functional domains in an entire functional instance to another functional instance. In some examples, a data center in Japan may have a functional instance that is deployed with multiple functional domains. The enterprise may use one or more functional domains from the Japan data center in another data center, such as an Australian data center. To do this, the enterprise may copy one or more security policies from functional domains in the Japan data center for use in the Australian data center. One or more functional domains or the entire set of functional domains from the Japan data center may be deployed in the Australian data center.

It may be possible that the copied functional domains that are instantiated in the Australian data center may include security policies that may not be desirable. For example, a security policy may designate a source and a destination to allow network traffic through a firewall into the Australian data center. Depending on network traffic for the Australian data center, the destination may or may not receive traffic in the Australian data center. For example, the source and the destination may have been appropriate to receive traffic in the Japanese data center, but may not be appropriate for the Australian data center. In some examples, the IP address for the destination may not be used in the Australian data center. This may result in a security issue that is allowing connectivity to the Australian data center that could be leveraged by an attacker. For example, the attacker may be able to exploit the security policy that allows network traffic to the destination.

In view of the above, some embodiments may analyze the security policies for functional domains to determine whether the security policies should be updated. For example, the system may analyze whether or not the security policy is being used. In some examples, the system may analyze whether there is network traffic flowing through the network that is allowed by the security policy in the Australian data center. If network traffic through the Australian data center is associated with the security policy, then the system may validate the security policy as being used. If the security policy is not being used, such as no network traffic is associated with the security policy, then the system may generate an update to the security policy. For example, the system may generate an adjustment to the security policy or a recommendation to remove it from the functional domain. In some embodiments, the system may output a suggestion for the change that can be reviewed by a user.

Accordingly, the system may detect security policies that may not be appropriate for a functional domain that has been copied from another functional instance. The functional domain may have included a security policy that was appropriate for another functional instance, but may not be appropriate for the present functional instance. This may improve the network as possible security vulnerabilities may be detected before they are exploited. Also, storage may be improved because security policies that are not being used may be removed from the functional domains. Additionally, having fewer security policies may simplify the configuration of the functional domains.

System Overview

FIG. 1 depicts an example of a system for analyzing policies according to some embodiments. System 100 includes a platform 102 and functional instances 104-1 to 104-N.

Platform 102 may be implemented using one or more computing devices. Platform 102 may be used to configure functional instances 104-1 to 104-N. For example, the configuration may configure network security for functional instances 104-1 to 104-N.

Each of functional instances 104-1 to 104-N may be a group that is defined for security purposes. For example, a functional instance 104 may be associated with one or more computing devices, such as a cloud deployment in a region. In some examples, functional instance 104-1 may be associated with a cloud data center deployment in Japan, functional instance 104-2 may be associated with a cloud data center deployment in Australia, and functional instance 104-N may be associated with a cloud data center deployment in the United States. Although different regions are described, functional instances 104 may be deployed in different ways. For example, a single data center may include multiple functional instances.

Each functional instance 104-1 to 104-N may include one or more respective functional domains 112-1 to 112-N. Each functional domain 112 can include one or more of: security groups of computing services, one or more subnets, one or more ingress rules, one or more egress rules, etc. A functional domain may be associated with security policies. The security policies may define rules that are used to analyze network traffic. In some examples, a functional domain refers to a unique infrastructure of services and security groups that are categorized under an identifiable function. The function can be independent of other functions and related to any of a variety of enterprise purposes. For instance, a functional domain can be for the purpose of sales, marketing, or human resources (HR). For each functional domain, a set of security groups is identified. In some examples, a "Processing" security group and the "Logging Monitoring" security group may be identified in functional domain A. Each security group may be associated with a group of security policies. There may be one or many functional domains declared within a functional instance. Examples of functional instances, functional domains, and security policies are described in U.S. patent application Ser. No. 16/948,399, entitled "NETWORK SECURITY ORCHESTRATION AND MANAGEMENT ACROSS DIFFERENT CLOUDS", filed Sep. 16, 2020, which is incorporated by reference in its entirety for all purposes.

Platform 102 includes a policy builder 106 that may generate security policies. The security policies may include different rules that can be applied to network traffic. A security policy can form a set indicating permitted communications between or among computing resources. Policy builder 106 may define a respective policy set for functional domains 112. Then, a policy deployer 108 may configure functional instances 104-1 to 104-N with functional domains 112-1 to 112-N. In some examples, functional instance 104-1 may be configured with functional domains 112-1. Then, it may be decided that functional instance 104-2 should include at least some of the same functional domains 112 from functional instance 104-1. Policy deployer 108 may copy some functional domains 112-1 from functional instance 104-1 to functional instance 104-2. In some examples, after instantiating the functional domains 112 in a data center in Japan, the enterprise may want to use the same functional domains 112 in a data center in Australia. This may save time in configuring the security policies for the data center in Australia from scratch.

An example of a security policy may include a rule that may indicate permitted communications between or among computing resources. These security policies may be used by computing resources to enforce the rule. For example, a firewall may use these security policies to determine whether to allow or reject network traffic that is received at the firewall from either an outside source or an internal source.

A security policy may specify parameters that are used to enforce the rule. An example of parameters may be one or more of a source, a destination, a source port, a destination port, and a protocol, but other parameters may be used. The source may be the source of an entity that sent the network traffic and the destination is the destination of where the network traffic is being sent. The source and destination may be identified in different granularities. For example, the source and destination may be IP addresses, an IP subnet range, or any other ways of identifying a source and a destination for network traffic. Also, the security policy may define a port that is used to send or receive the network traffic. Also, specific protocols that can be used. One example of a security policy may be a destination of a subnet range of 10.0.0.0/12, a destination port of 1-65355, and two protocols of Transfer Control Protocol (TCP) and Unified Datagram Protocol (UDP). The source may be defined specifically or any source may be specified. In some examples, network traffic received for a particular IP addresses within the subnet range as a destination on the identified port using the protocols specified from an allowed source may be allowed by a firewall.

As described above, some problems may result from copying functional domains from other functional instances 104. A policy self-healing manager 110 may analyze the security policies that are associated with functional domains 112. Based on the analysis, policy self-healing manager 110 may determine updates to the security policies. For example, policy self-healing manager 110 may analyze network flow data that describes network traffic that is associated with the security policies. In some examples, if some security policies are associated with network traffic that does not meet a threshold (e.g., below) in a functional domain, then policy self-healing manager 110 may recommend updates to the security policy. For example, when network traffic that is received from a source for a destination that is defined by a security policy, then policy self-healing manager 110 determines that this security policy is being used. In some examples, when security policies are not associated with any network traffic, a recommendation may be to remove the security policy from a functional domain 112 in a functional instance 104, or to change the source, destination, and/or port, or other parameters of the security policy.

To generate the recommendations, policy self-healing manager 110 may analyze network traffic that is associated with security policies in different functional instances. For example, a security policy for a functional domain 112 in a data center in Japan may be associated with network traffic. However, the same security policy in another functional domain 112 in a data center in Australia may not be associated with any network traffic. Policy self-healing manager 110 may determine that the source and the destination may have been appropriate for the Japan data center, but not in the Australian data center. Then, policy self-healing manager 110 may recommend an update to the security policy in the data center in Australia. For example, policy self-healing manager 110 may recommend updates to the source and the destination of the security policy, recommend removing the security policy, or other recommendations.

The following will describe the process of creating functional domains and then the analysis of the security policies in more detail.

Creation of Functional Instances and Functional Domains

Figure 2:
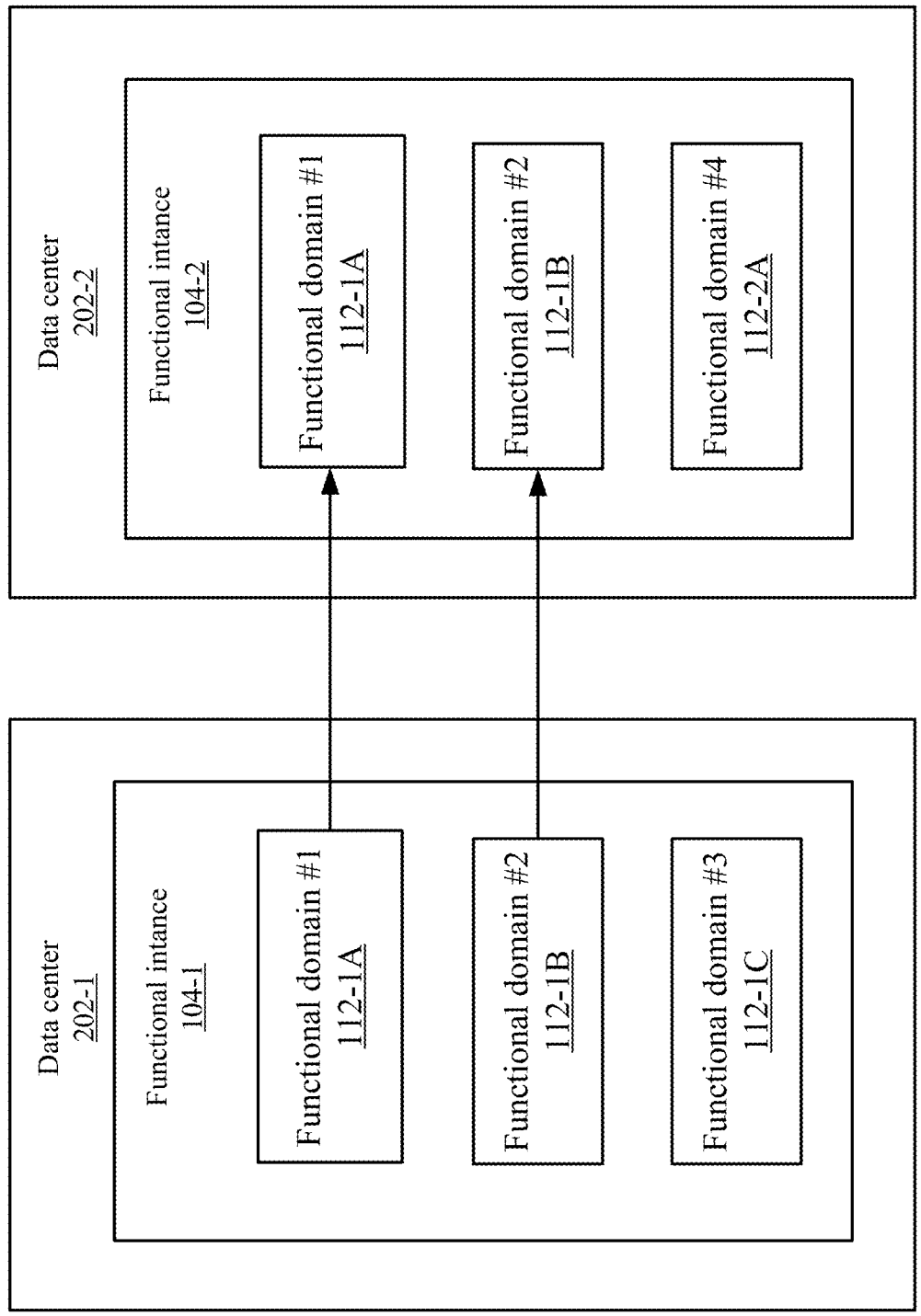
FIG. 2 depicts an example of creating functional instances according to some embodiments.

FIG. 2 depicts an example of creating functional instances 104-1 and 104-2 according to some embodiments. A data center 202-1 and a data center 202-2 are shown. For example, data center 202-2 may be located in Japan and data center 202-2 may be located in Australia. Although two data centers are shown, the transfer of functional domains may be found in the same data center.

Data center 202-1 includes a functional instance 104-1, which includes a functional domain #1 112-1, a functional domain #2 112-2, and a functional domain #3 112-3. An enterprise may want to reuse some functional domains from functional instance 104-1 in data center 202-2. For example, an enterprise may be creating a new data center in Australia and wants to reuse some security policies from the data center in Japan. For example, policy deployer 108 may copy functional domain #1 112-1A and functional domain #2 112-1B to a functional instance 104-2 in data center 202-2. Additionally, policy deployer 108 may create a functional domain #4 112-2A in data center 202-2. Functional domain #4 112-2A may not be found in functional instance 104-1.

Functional domain #1 112-1A and functional domain #2 112-1B in functional instance 104-2 may include the same security policies as that found in functional instance 104-1. Additionally, policy deployer 108 may make some changes to the security policies. For example, policy deployer 108 may add some security policies or delete some of these security policies from functional domain #1 112-1A or functional domain #2 112-1B in functional instance 104-2.

As discussed above, policy self-healing manager 110 may analyze the security policies in functional domains 112 to determine security policies that may need to be updated. When copying security policies from functional domains 112 from one data center 202-1 to another data center 202-2, some security policies may not be optimal for the new data center 202-2. For example, the destination in data center 202-2 may not be found in data center 202-2, and network traffic may not be received for that destination. Or, the source or the destination may be undesirable for allowing network traffic. For example, data center 202-2 may not want a destination that is defined in a security policy that was copied from data center 202-1 to receive data, but data center 202-1 may use the destination differently and does not want to receive network traffic at that destination.

The following will now describe the analysis of security policies according to some embodiments.

Network Flow Analysis

Figure 3:
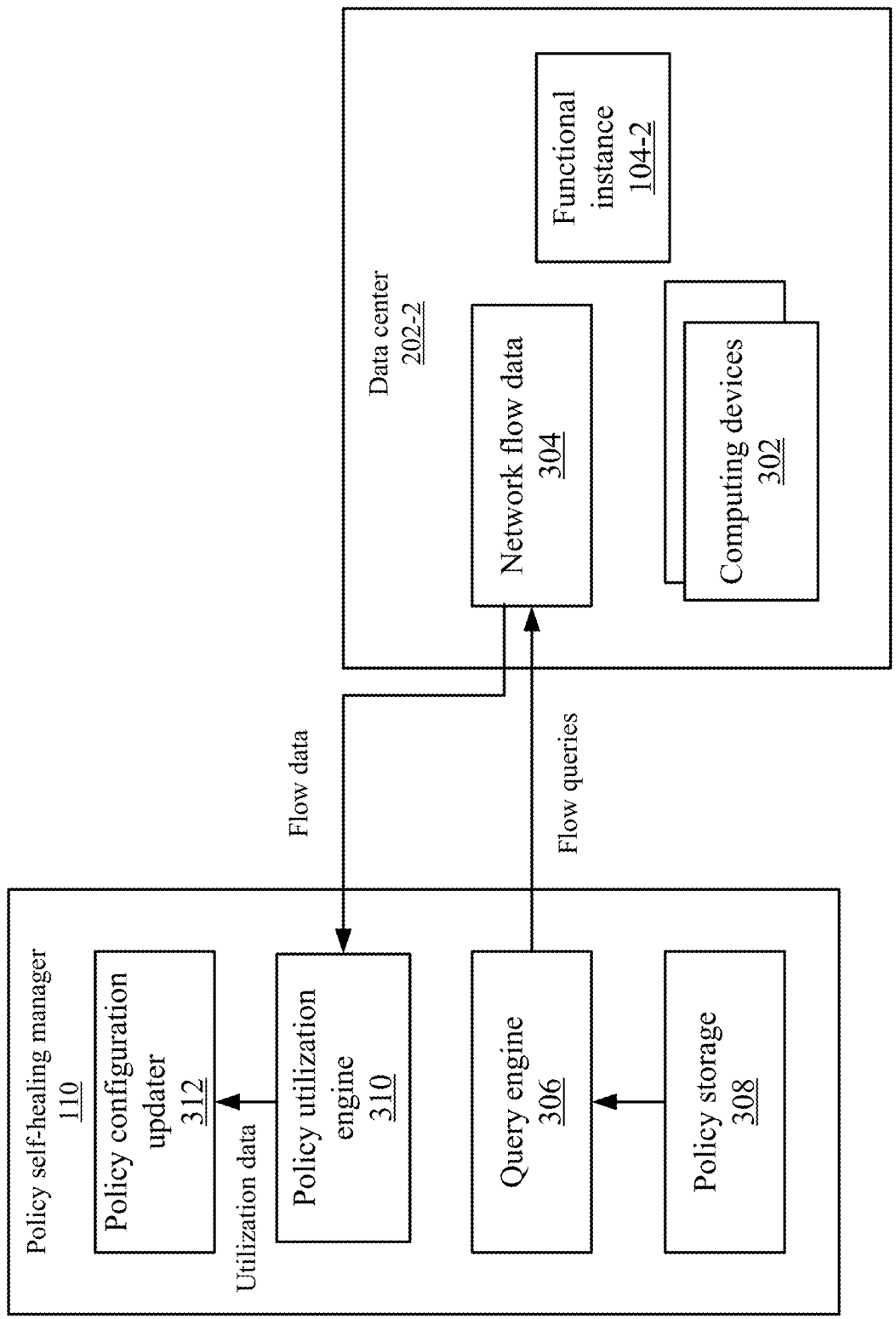
FIG. 3 depicts an example of analyzing network flow data according to some embodiments.

FIG. 3 depicts an example of analyzing network flow data according to some embodiments. Network flow data may summarize network traffic (e.g., number of bytes, packets, etc.) that is processed, such as received or sent, by a firewall. Policy self-healing manager 110 may monitor network flow data 304 from different functional instances 104. In this example, network flow data 304 for functional instance 104-2 is monitored, but the same process may be performed for other functional instances. In data center 202-2, computing devices 302 may receive or send network traffic. A firewall may process the network traffic to allow the network traffic to be received by computing devices 302 and also allow network traffic to be sent from computing devices 302. As network traffic is received or sent, data center 202-2 may store network flow data 304, which may summarize network traffic. For example, network flow data 304 may store a combination of identification information, such as a 5-tuple that may include a source, a destination, a source port, a destination port, and a protocol for network traffic, but other methods of storing network flow data may be appreciated.

A query engine 306 may determine flow queries to send to data center 202-2 to retrieve network flow data 304. For example, query engine 306 may use security policies that are stored in policy storage 308 to determine which queries to send. The queries that are sent may specify different network flow data to retrieve. In some embodiments, query engine 306 may use the parameters of the security policy, such as the 5-tuple, to generate flow queries for network flow data 304. In some examples, if a subnet is listed a security policy, query engine 306 generates a flow query to retrieve all network traffic that is sent to IP addresses in that IP subnet. Query engine 306 may generate flow queries for all or a portion of security policies that are found in a functional domain 112 of a functional instance 104-2. In some examples, copied functional domains 112 in functional instance 104-2 are identified and flow queries for the security policies of those functional domains 112 are sent. The copied functional domains 112 may include security policies that may not be appropriate for this functional instance 104-2. Also, flow queries for functional domains 112 that were not copied could also be sent.

Data center 202-2 may respond to the flow queries and send flow data back to policy self-healing manager 110. The flow data may summarize network traffic that meets the query parameters. For example, data center 202-2 may maintain counters that count the network traffic based on 5-tuples associated with the network traffic. The counts from the counters may be sent to policy self-healing manager 110. A policy utilization engine 310 may analyze the flow data to determine which flow data is associated with which security policies. For example, policy utilization engine 310 may generate utilization data for a given period, such as 30 days. In some examples, for a security policy #1, policy utilization engine 310 may aggregate the counts from multiple queries to generate an aggregated amount of network traffic, such as one million Megabytes (MB) of data. For example, the counts for the last 30 days may be used. For a second security policy #2, policy utilization engine 310 may indicate zero MBs of data is associated with this security policy.

A policy configuration updater 312 may analyze the utilization data to determine any updates to security policies for functional instance 112-2. For example, for security policy #2, it can be determined that the security policy was not used because no network traffic was associated with security policy #2 during the given period. Policy configuration updater 312 may determine an update based on the utilization data indicating zero network traffic was received during the period. Policy configuration updater 312 may determine different updates. For example, policy configuration updater 312 may generate a recommendation to remove the security policy. By removing the security policy, any security vulnerability may be eliminated. For example, the destination of the security policy may allow traffic from a source to the destination. If the security policy is not applicable to a destination in data center 202-2, then removal of the security policy may remove a potential option for an entity to attack the network. Other updates may also be used, such as generating a recommendation to adjust the destination. For example, an IP subnet may be adjusted to be a subset of the IP addresses in the IP subnet. Different updates will be described in more detail below.

The following will describe a policy monitoring method and a policy update method based on analyzing the utilization data.

Policy Monitoring

Figure 4:
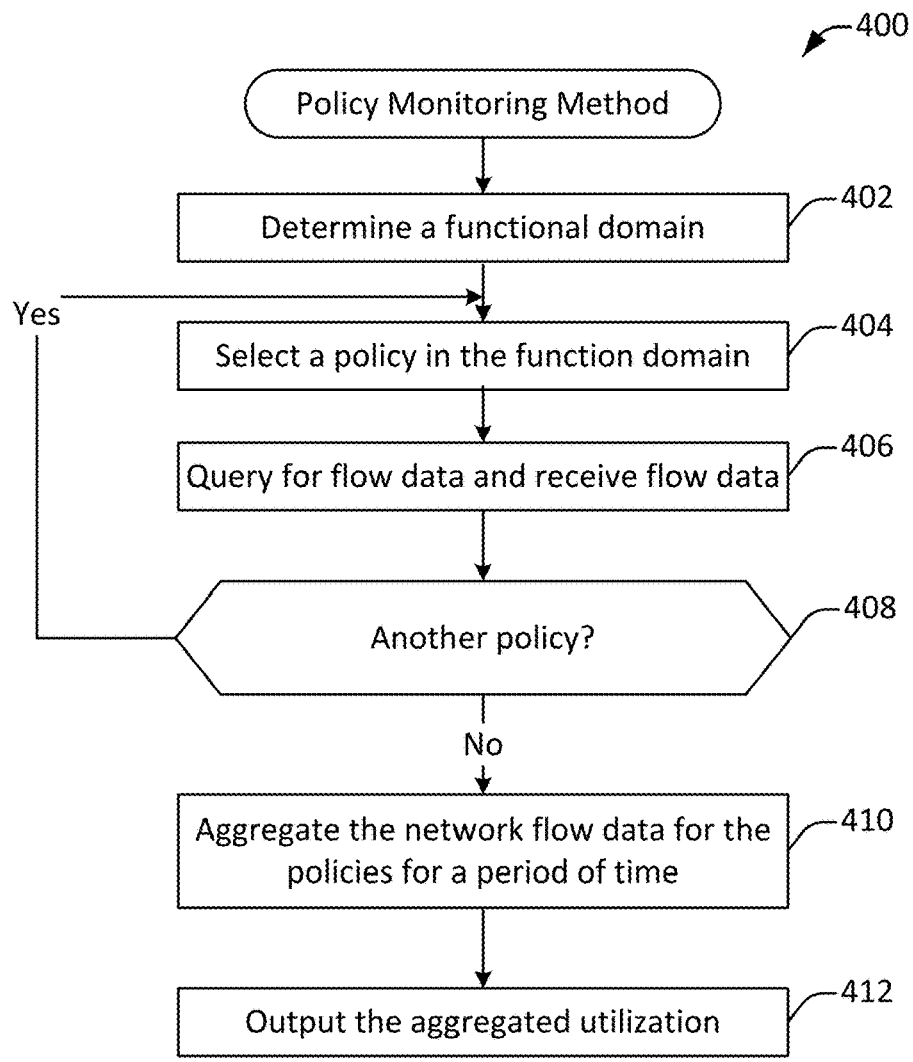
FIG. 4 depicts a method of monitoring policies according to some embodiments.

FIG. 4 depicts a method of monitoring policies according to some embodiments. At 402, policy configuration updater 312 determines a functional domain. In some examples, policy configuration updater 312 may analyze copied functional domains 112, but could analyze each functional domain 112 in a functional instance 104 regardless of it being copied. At 404, policy configuration updater 312 selects a security policy in a functional domain 112. Then, 406, query engine 306 queries for the network flow data 304 for the security policy. As discussed above, the query may be generated based on a 5-tuple, or other information that can retrieve associated network flow data for a security policy. Query engine 306 then sends the query to the applicable data center 202 that is implementing the functional domain 112. Then, policy utilization engine receives the network flow data. The network flow data may be a counter of network traffic that was received. The counter may count the amount of network traffic for a period of time, such as an hour, day, week, month, etc.

At 408, query engine 306 determines if there is another security policy to analyze. If so, the process reiterates to 404 where another security policy is selected. If there is not another security policy, at 410, policy utilization engine 310 aggregates the network flow data for the security policies for a period of time. For example, the period of time may be the last 30 days or another period that allows an analysis of whether a security policy is being used or not. Policy utilization engine 310 may use different methods to aggregate network flow data. For example, policy utilization engine 310 may use counters that may that incremented for different security policies. For example, 5-tuples may be used for a security policy to determine which network traffic is associated with a security policy. The 5-tuple may include a source, a destination, a source port, a destination port, and a protocol, but other methods of associating network flow data with a security policy may be used. When X MBs of data is associated with a security policy, policy utilization engine 310 may increment the counter for the security policy by the number of MBs. For example, if the network flow data is for one day of network traffic, policy utilization engine 310 increments a counter based on the network traffic for one day to generate a value for the last 30 days. The data for days after the last 30 days may be removed. This process may continue. At 412, policy configuration updater 312 outputs the aggregated utilization for security policies based on the network flow data. Although the above method of aggregating utilization data is described. other methods may be used. For example, data center 202 may aggregate the network traffic for the security policies. Query engine 306 may set of counters to aggregate the network traffic for different 5-tuples for the security policies.

Policy Update

Figure 5:
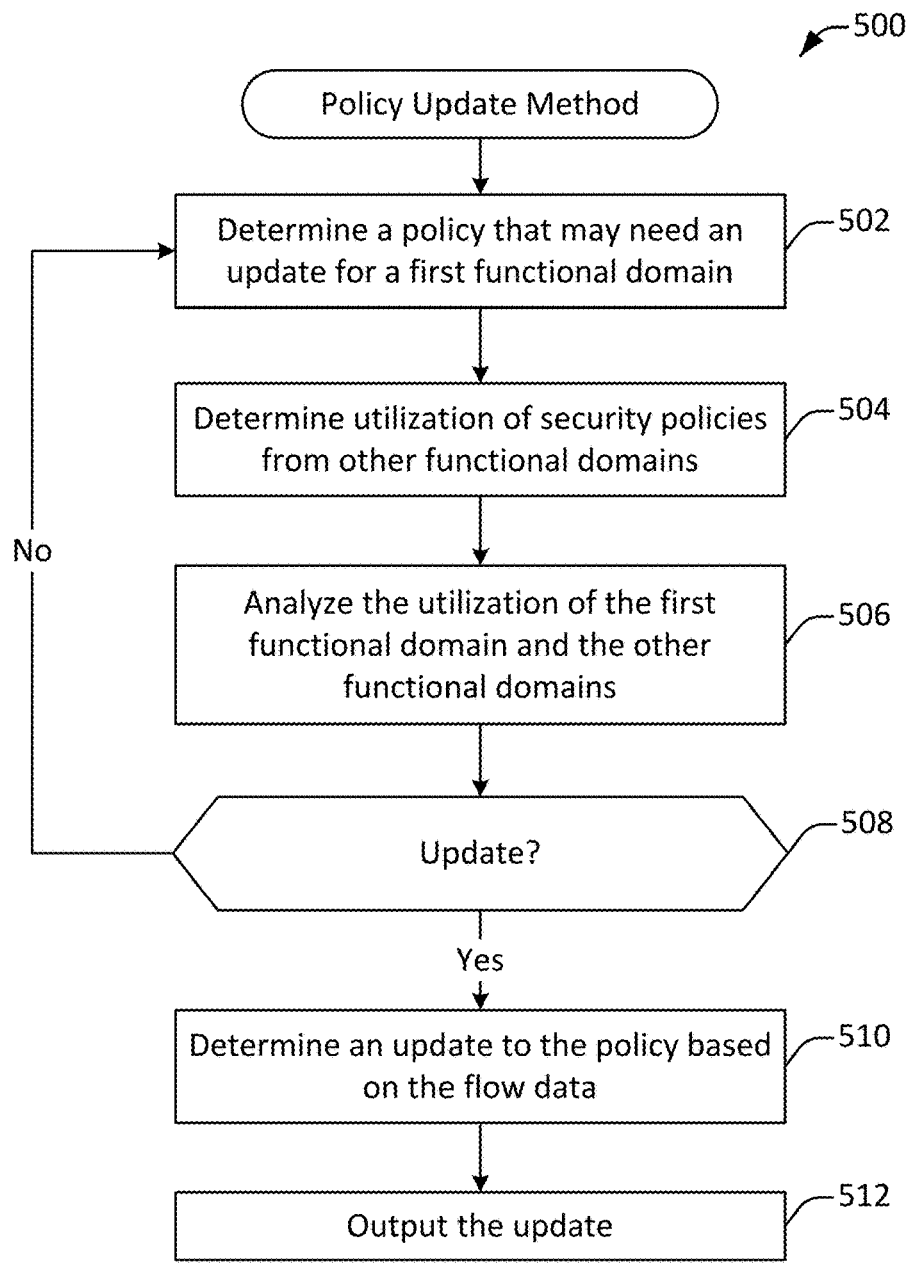
FIG. 5 depicts a simplified flow chart of a method for determining a policy update according to some embodiments.

FIG. 5 depicts a simplified flow chart 500 of a method for determining a policy update according to some embodiments. At 502, policy configuration updater 312 determines a policy that may need an update for a first functional domain. For example, the utilization data for the security policy may indicate that the amount of network traffic that is associated with the security policy does not meet a threshold, such as a below a threshold. In some instances, the threshold may be zero, but other thresholds may be used.

At 504, policy configuration updater 312 determines utilization of the security policy from other functional domains that are different from the first functional domain. For example, the other functional domains may have the same security policy as the selected security policy The first functional domain may have been copied from one of the other functional domains.

At 506, policy configuration updater 312 analyzes the utilization of the first functional domain and the other functional domains. For example, policy configuration updater 312 may analyze counters for other functional domains that are associated with the security policy in each respective functional domain. The analysis may determine where the security policy is being used. For example, the security policy may be being used in a data center in Japan, but not a data center in Australia.

At 508, policy configuration updater 312 determines if an update to the security policy in the first functional domain is needed. If not, the process reiterates to 502 where another policy is selected.

If an update is determined to be needed, at 510, policy configuration updater 312 generates an update to the policy based on the flow data. The update may be needed when there is zero network traffic associated with the security policy in the first functional domain. Other methods of determining whether an update is needed may also be appreciated, such as the update to the policy may depend on different factors. For example, if there is network traffic associated with another functional domain that has the same security policy, policy configuration updater 312 may use that information to determine an update to the security policy in the first functional domain. In this scenario, the initial policies could be broad, which may suggest that all instances in functional domain type 1 can send messages to all instances of functional domain type 2, and this policy is made available in all functional instances where these functional domains are also instantiated. Now with the flow traffic analysis, the IP address for the rule can be mapped to the egress entity, which further maps to a functional domain in a functional Instance 1 and not in the other functional instance 2. With this flow information, policy configuration updater 312 can update the policy to only allow the rule of functional domain type 1→functional domain type 2 only in functional Instance 1 and not other functional instances.

Also, policy configuration updater 312 may remove the security policy because there is no network traffic associated with the security policy.

At 512, policy configuration updater 312 may output the update. For example, policy configuration updater 312 may not make the update directly to the security policy. Rather, policy configuration updater 312 may output the update for a user to review and this may not cause security policies to be removed or updated that should not be removed or updated.

CONCLUSION

Accordingly, security policies may be copied over from a first functional domain to a second functional domain. However, the second functional domain may not use the security policy. Instead of allowing the security policy to continue to operate in the second functional domain, policy self-healing manager 110 may analyze the security policies to determine which security policies should be updated. The process allows functional domains to be copied from one location to another to improve the configuration of data centers. However, the update allows the security policies to be updated when needed to reduce the likelihood of data breaches. This improves the network configuration and also the network operation by reducing the number of security policies that may not be useful.

Figure 6:
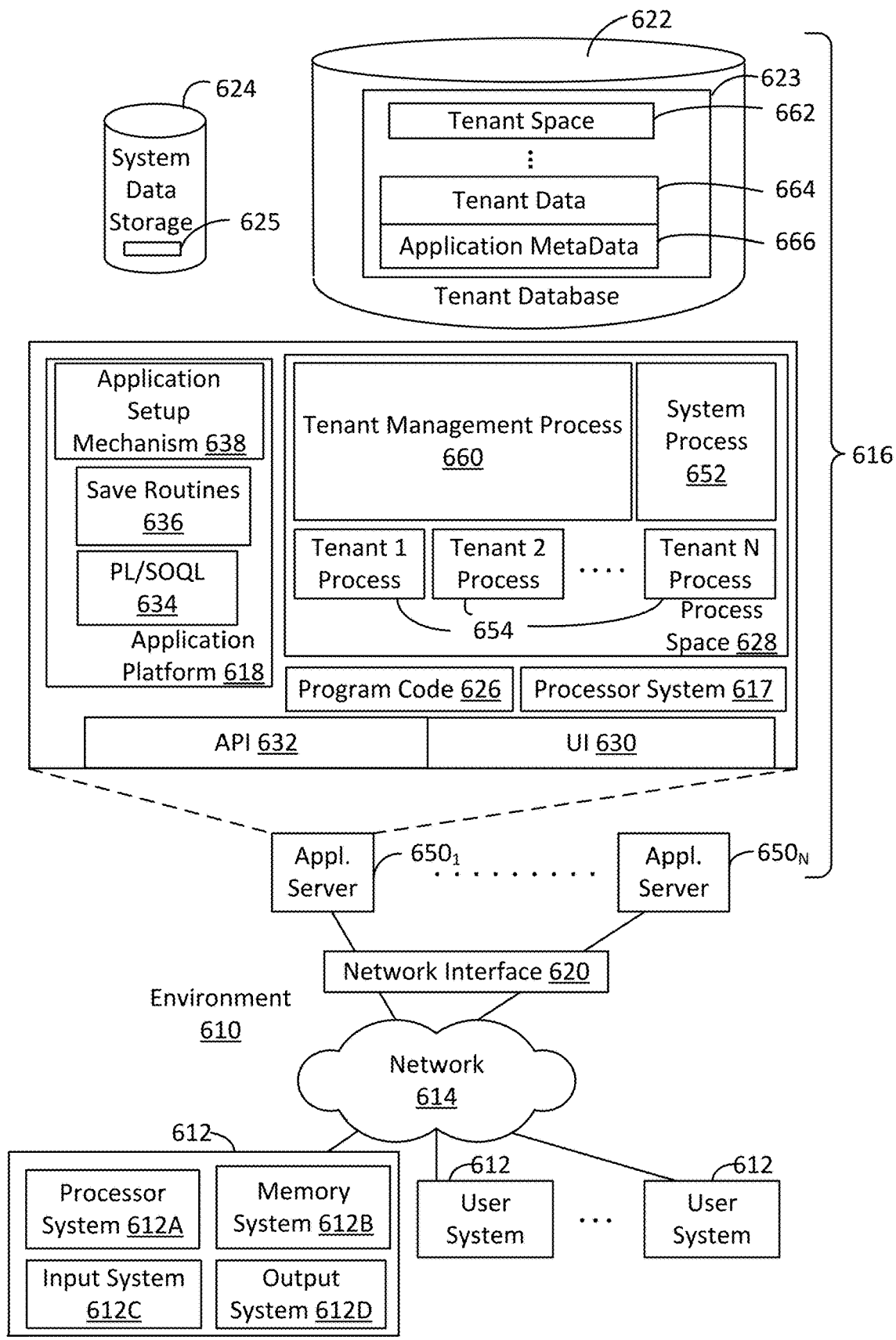
FIG. 6 shows a block diagram of an example of an environment that includes an on-demand database service configured in accordance with some implementations.

FIG. 6 shows a block diagram of an example of an environment 610 that includes an on-demand database service configured in accordance with some implementations. Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 618 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based security policy system. For example, in some implementations, system 616 may include application servers configured to implement and execute security policy software applications. The application servers may be configured to provide related data, code, forms, web pages and other information to and from user systems 612. Additionally, the application servers may be configured to store information to, and retrieve information from a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as a security policy system, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 7A:
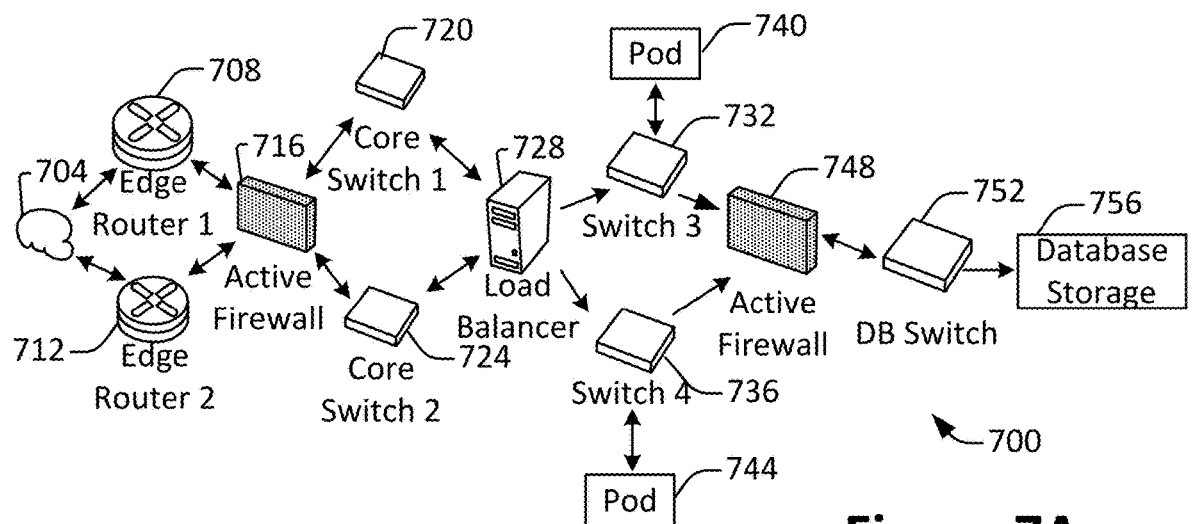
FIG. 7A shows a system diagram of an example of architectural components of an on-demand database service environment, configured in accordance with some implementations.

FIG. 7A shows a system diagram of an example of architectural components of an on-demand database service environment 700, configured in accordance with some implementations. A client machine located in the cloud 704 may communicate with the on-demand database service environment via one or more edge routers 708 and 712. A client machine may include any of the examples of user systems 612 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process security policy information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

Figure 7B:
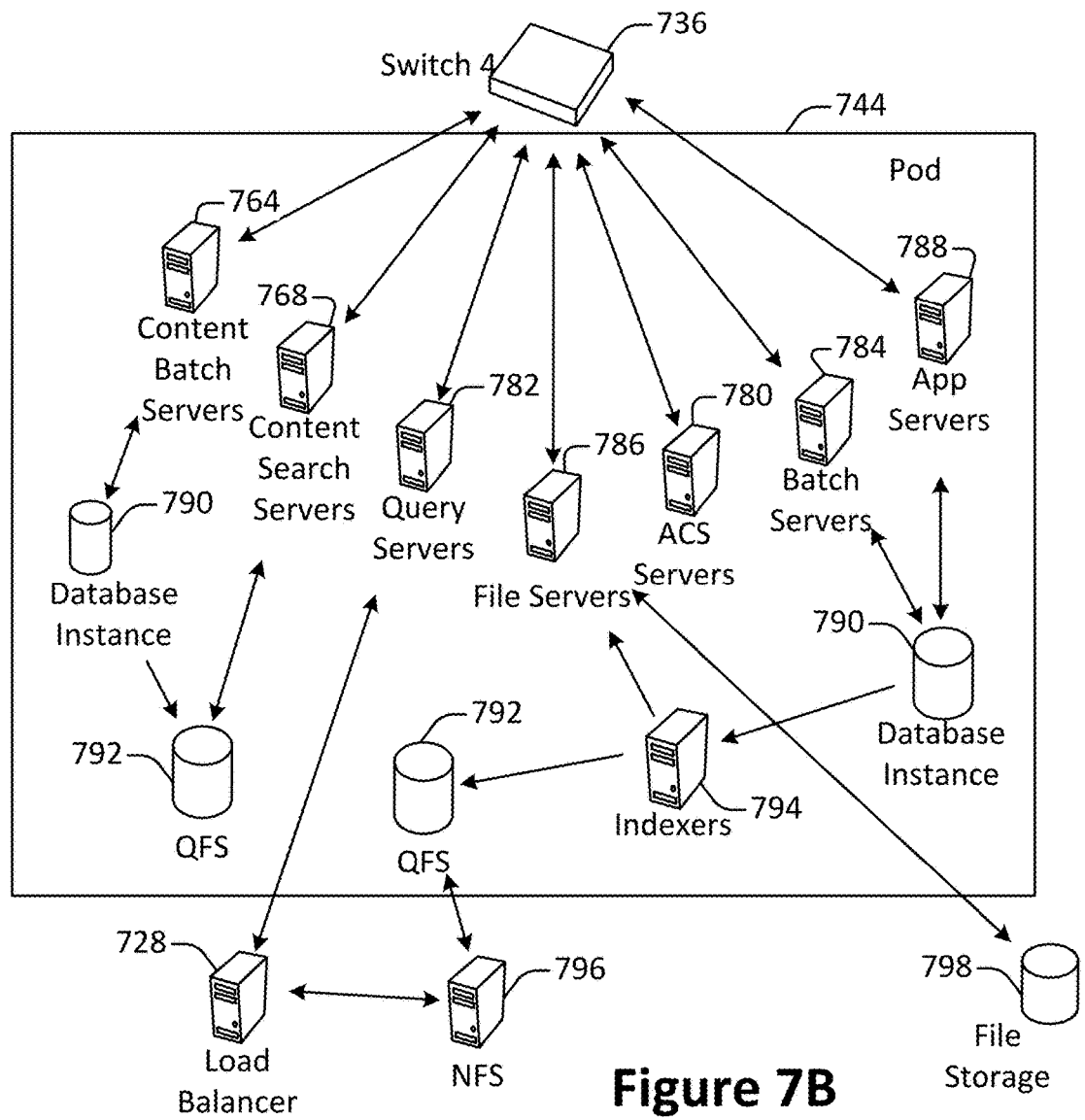
FIG. 7B shows a system diagram further illustrating an example of architectural components of an on-demand database service environment, in accordance with some implementations.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780, batch servers 784, and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MTS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744. The ACS servers 780 may control access to data, hardware resources, or software resources called upon to render services provided by the pod 744. The batch servers 784 may process batch jobs, which are used to run tasks at specified times. Thus, the batch servers 784 may transmit instructions to other servers, such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 8:
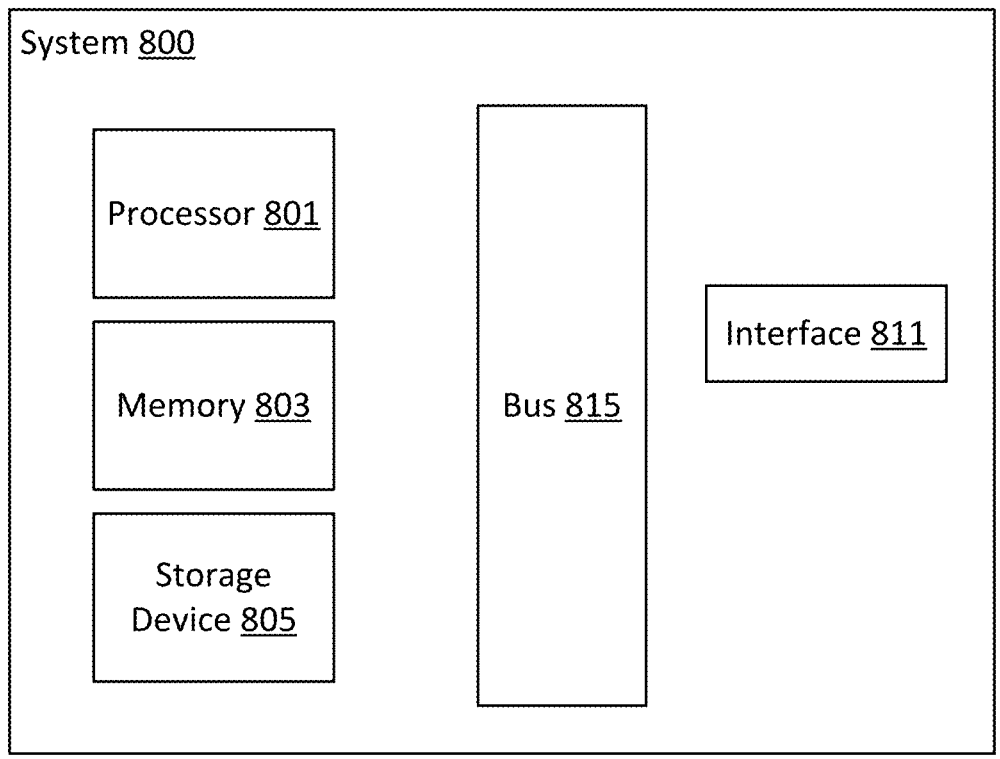
FIG. 8 illustrates one example of a computing device.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   determining a first functional domain that includes a group of security policies that have been copied from a second functional domain;
   analyzing parameters of the group of security policies to generate queries for network traffic, wherein the queries include a source and a destination, wherein the source and the destination is specified in a security policy in the group of security policies in the first functional domain;
   querying network flow data to determine which network traffic in the first functional domain is associated with the source and the destination of the queries;
   aggregating usage of security policies in the group of security policies based on network traffic being associated with the respective security policies;
   analyzing the usage to determine utilization of the security policy in the first functional domain based on the network traffic including the source and the destination specified in the security policy; and
   based on the analyzing, generating a recommendation to change the security policy in the first functional domain.

2. The method of claim 1, wherein determining the first functional domain comprises:
   selecting the first functional domain based on the first functional domain being instantiated in a first functional instance, wherein the group of security policies is copied from a second functional instance in the second functional domain.

3. The method of claim 1, further comprising:
   deploying the first functional domain in a first functional instance, wherein deploying comprises copying the group of security policies from the second functional domain to the first functional domain.

4. The method of claim 1, wherein:
   the first functional domain is instantiated in a first functional instance, and
   the second functional domain is instantiated in a second functional instance.

5. The method of claim 1, wherein analyzing parameters of the group of security policies to generate queries for network traffic comprises:
   determining a query based on a rule of the security policy.

6. The method of claim 5, wherein the query comprises at least a portion of the source, the destination, a source port, a destination port, and a protocol.

7. The method of claim 6, wherein the query comprises the source, the destination, the source port, the destination port, and the protocol from the rule.

8. The method of claim 1, wherein:
   a computing resource generates network flow data for a combination of identification information for network traffic, and
   a query specifies the identification information for the security policy to retrieve the network flow data for the security policy.

9. The method of claim 1, further comprising:
   aggregating the utilization for network traffic that is associated with the security policy over a period of time.

10. The method of claim 1, wherein analyzing utilization of the security policy based on the network traffic comprises:
    comparing the utilization to a threshold; and
    determining the recommendation based on the comparing.

11. The method of claim 10, wherein determining the recommendation comprises:
    determining when the utilization does not meet a threshold,
    recommending the change when the utilization does not meet the threshold, and
    not recommending the change when the utilization meets the threshold.

12. The method of claim 10, wherein determining the recommendation comprises:
    recommending the change when the utilization is zero in a period of time.

13. The method of claim 1, wherein analyzing utilization of the security policy based on the network traffic comprises:
    analyzing second network traffic that is associated with the security policy in the second functional domain; and
    determining the recommendation based on the second network traffic and the utilization of the security policy based on the network traffic in the first functional domain.

14. The method of claim 1, wherein generating the recommendation to change the security policy in the first functional domain comprises:
    recommending a removal of the security policy in the first functional domain.

15. The method of claim 1, wherein generating the recommendation to change the security policy in the first functional domain comprises:
    recommending a change of parameters for the security policy in the first functional domain.

16. The method of claim 15, wherein the change of parameters comprises a change of a destination for the security policy.

17. A non-transitory computer-readable medium comprising computer-readable program code capable of being executed by one or more processors configurable to cause:
    determining a first functional domain that includes a group of security policies that have been copied from a second functional domain;
    analyzing parameters of the group of security policies to generate queries for network traffic, wherein the queries include a source and a destination, wherein the source and the destination is specified in a security policy in the group of security policies in the first functional domain;

querying network flow data to determine which network traffic in the first functional domain is associated with the source and the destination of the queries;

aggregating usage of security policies in the group of security policies based on network traffic being associated with the respective security policies;

analyzing the usage to determine utilization of the security policy in the first functional domain based on the network traffic including the source and the destination specified in the security policy; and based on the analyzing, generating a recommendation to change the security policy in the first functional domain.

18. The transitory computer-readable medium of claim 17, wherein determining the first functional domain comprises:

selecting the first functional domain based on the first functional domain being instantiated in a first functional instance, wherein the group of security policies is copied from a second functional instance in the second functional domain.

19. The transitory computer-readable medium of claim 17, wherein determining the recommendation comprises:

determining when the utilization does not meet a threshold, recommending the change when the utilization does not meet the threshold, and not recommending the change when the utilization meets the threshold.

20. An apparatus comprising:

one or more computer processors; and a computer program product comprising computer-readable program code capable of being executed by one or more processors when retrieved from a non-transitory computer-readable medium, the program code comprising instructions configurable to cause:

determining a first functional domain that includes a group of security policies that have been copied from a second functional domain;

analyzing parameters of the group of security policies to generate queries for network traffic, wherein the queries include a source and a destination, wherein the source and the destination is specified in a security policy in the group of security policies in the first functional domain;

querying network flow data to determine which network traffic in the first functional domain is associated with the source and the destination of the queries;

aggregating usage of security policies in the group of security policies based on network traffic being associated with the respective security policies;

analyzing the usage to determine utilization of the security policy in the first functional domain based on the network traffic including the source and the destination specified in the security policy; and based on the analyzing, generating a recommendation to change the security policy in the first functional domain.

* * * * *